US006863488B2

(12) United States Patent
Chopra

(10) Patent No.: US 6,863,488 B2
(45) Date of Patent: Mar. 8, 2005

(54) FOLDABLE TIRE DOLLY

(75) Inventor: Kewal K. Chopra, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/361,038

(22) Filed: Feb. 7, 2003

(65) Prior Publication Data

US 2004/0156700 A1 Aug. 12, 2004

(51) Int. Cl.[7] .............................................. B60B 30/10
(52) U.S. Cl. ...................... 414/429; 414/430; 280/79.4
(58) Field of Search ................................. 414/429, 430; 280/79.4, 639, 641, 651, 659, 79.11, 638; 29/559, 434, 824

(56) References Cited

U.S. PATENT DOCUMENTS

| | | | | |
|---|---|---|---|---|
| 1,964,119 A | * | 6/1934 | Hendry ........................ 414/427 |
| 2,392,830 A | * | 1/1946 | Baum ........................... 414/428 |
| 2,414,383 A | * | 1/1947 | Merriam ...................... 414/430 |
| 2,569,050 A | * | 9/1951 | Gref et al. ................... 414/480 |
| 2,573,728 A | * | 11/1951 | Pugh, Sr. ..................... 414/430 |
| 2,664,685 A | * | 1/1954 | Phelps ......................... 56/320.1 |
| 2,969,245 A | * | 1/1961 | Wilson ......................... 280/641 |
| 3,066,946 A | * | 12/1962 | Nelson ..................... 280/79.11 |
| 3,830,387 A | * | 8/1974 | Virnig ......................... 414/427 |
| 3,843,000 A | * | 10/1974 | Bennett ....................... 414/433 |
| 4,121,788 A | * | 10/1978 | McMahon .................... 244/50 |
| 4,286,369 A | * | 9/1981 | Fusco ........................... 29/273 |
| 4,465,421 A | * | 8/1984 | Murillo ........................ 414/430 |
| 4,692,082 A | * | 9/1987 | Smith ........................... 414/429 |
| 4,796,909 A | * | 1/1989 | Kirkendall ................... 280/651 |
| 4,854,803 A | * | 8/1989 | Coccaro ....................... 414/429 |
| 4,900,215 A | * | 2/1990 | Nowell ........................ 414/428 |
| 4,913,459 A | * | 4/1990 | Smeitink ..................... 280/641 |
| 4,976,449 A | * | 12/1990 | Lotspeich et al. ......... 280/79.4 |
| 5,039,123 A | * | 8/1991 | Smeitink ..................... 280/641 |
| 5,161,932 A | * | 11/1992 | Johnson ....................... 414/430 |
| 5,248,235 A | * | 9/1993 | Poten et al. ................. 414/430 |
| 5,257,443 A | * | 11/1993 | Tanimura et al. ........... 29/33 R |
| 5,433,469 A | * | 7/1995 | Cassels ........................ 280/655 |
| 5,568,956 A | * | 10/1996 | Benefield ...................... 294/15 |
| 5,709,520 A | * | 1/1998 | Pish ............................. 414/427 |
| 5,732,960 A | * | 3/1998 | Elam .......................... 280/79.4 |
| 5,870,824 A | * | 2/1999 | Lilja et al. .................. 29/889.1 |
| 5,984,611 A | * | 11/1999 | Warner ........................ 414/430 |
| 6,079,777 A | * | 6/2000 | Simmons et al. ......... 297/217.1 |
| 6,095,745 A | * | 8/2000 | Garnett ........................ 414/427 |
| 6,179,542 B1 | * | 1/2001 | Haven ......................... 414/428 |
| 6,382,644 B1 | * | 5/2002 | Rawlings .................... 280/79.4 |
| 6,390,759 B1 | * | 5/2002 | Novak et al. ................ 414/430 |
| 6,540,470 B2 | * | 4/2003 | Smith et al. ................. 414/430 |

* cited by examiner

Primary Examiner—Eileen D. Lillis
Assistant Examiner—Rashmi Sharma
(74) Attorney, Agent, or Firm—David L. Kuhn; Luis Miguel Acosta

(57) ABSTRACT

A foldable dolly for moving and positioning a vehicle tire assembly is formed with a rectangular base member mounted on a plurality of casters. Two wings are hinged to opposite ends of the rectangular member and have adjustable positioning members having one end attached to the base member and the other end attached to one of the wings. A plurality of bearings at least one bearing being mounted on each wing and one on the rectangular base member allow rotation of the tire assembly on the dolly and easy withdrawal of the dolly when the tire is mounted on a vehicle.

2 Claims, 2 Drawing Sheets

FOLDABLE TIRE DOLLY

GOVERNMENT INTEREST

The invention described herein may be made, used and licensed by and for United States Government purposes without paying me any royalty.

BACKGROUND OF THE INVENTION

This invention relates to dollies useful for the removal, moving and mounting of vehicle tires. More particularly, the dolly is useful in mounting and unmounting large vehicle tires from a vehicle.

The military uses a variety of tactical ground vehicles, all of which use large truck tires. When changing or rotating the tires the troops are required to lift and position the tires, which is a difficult and time-consuming job. It is particularly difficult for the smaller members of the armed services who may lack both the strength and height necessary to position the large tires on an axle which is a substantial height above ground level. Wheeled dollies useful for removing or mounting vehicle wheels are known in the art. Generally such devices are constructed with a mainframe having upright standards and a second frame supported on the mainframe, which holds a tire assembly and is movable vertically on the upright standards to lift and position the tire. Such devices are by nature heavy and bulky. The combination of weight and storage space required by such structures makes them unsuitable for use in military units, which are deployed throughout the world.

It would be desirable to have a folding, lightweight tire dolly that can be easily stored as part of the equipment for tire changing and rotation on a military vehicle. Such a device should be of simple construction, collapsible to minimum space requirement, and allow for easy loading of the tire on the dolly for transport. The dolly should also have means to allow the tire to be rotated on the dolly into a position where the holes in the wheel rim are aligned with the threaded axle studs on which the tire assembly is mounted.

SUMMARY OF THE INVENTION

The present invention provides a foldable tire dolly having the desired characteristics outlined above. The dolly is useful for moving and positioning a vehicle tire assembly consisting of a tire mounted on a normal wheel rim which is designed to be attached to the threaded studs of an axle assembly. The dolly of this invention has a rectangular base member, preferably adjustable in length, designed to accommodate tires of various sizes. The rectangular base member is further mounted on a plurality of casters that can be used to move the dolly over a variety of surfaces.

The rectangular base member has a pair of adjustable wings, which are hinged to opposite ends of the rectangular base member. The hinges allow one of the wings to be positioned to form a ramp so that a tire can be easily rolled onto the rectangular base member and the wing raised to a supporting position where in combination with the wing on the opposite end of the rectangular base member the vehicle tire assembly will be held in a centered position on the base member. Adjustable positioning members are associated with the wings and rectangular base member with one end of the positioning member being attached to the base member and the other end attached to one of the wings. The positioning members can be adjusted so as to hold the wings in contact with the tire to keep the tire from excessive movement on the base member. The positioning memberes also intersect the angle between the associated wing and the base member to hold the tire in position on the dolly during movement of the dolly with the tire.

The tire dolly of this invention has a plurality of bearing surfaces with at least one bearing surface being mounted on each wing and one bearing surface on the rectangular base member to allow rotation of the tire into position so the wheel rim can engage the threaded studs on the axle.

DETAILED DESCRIPTION

Figure 1:
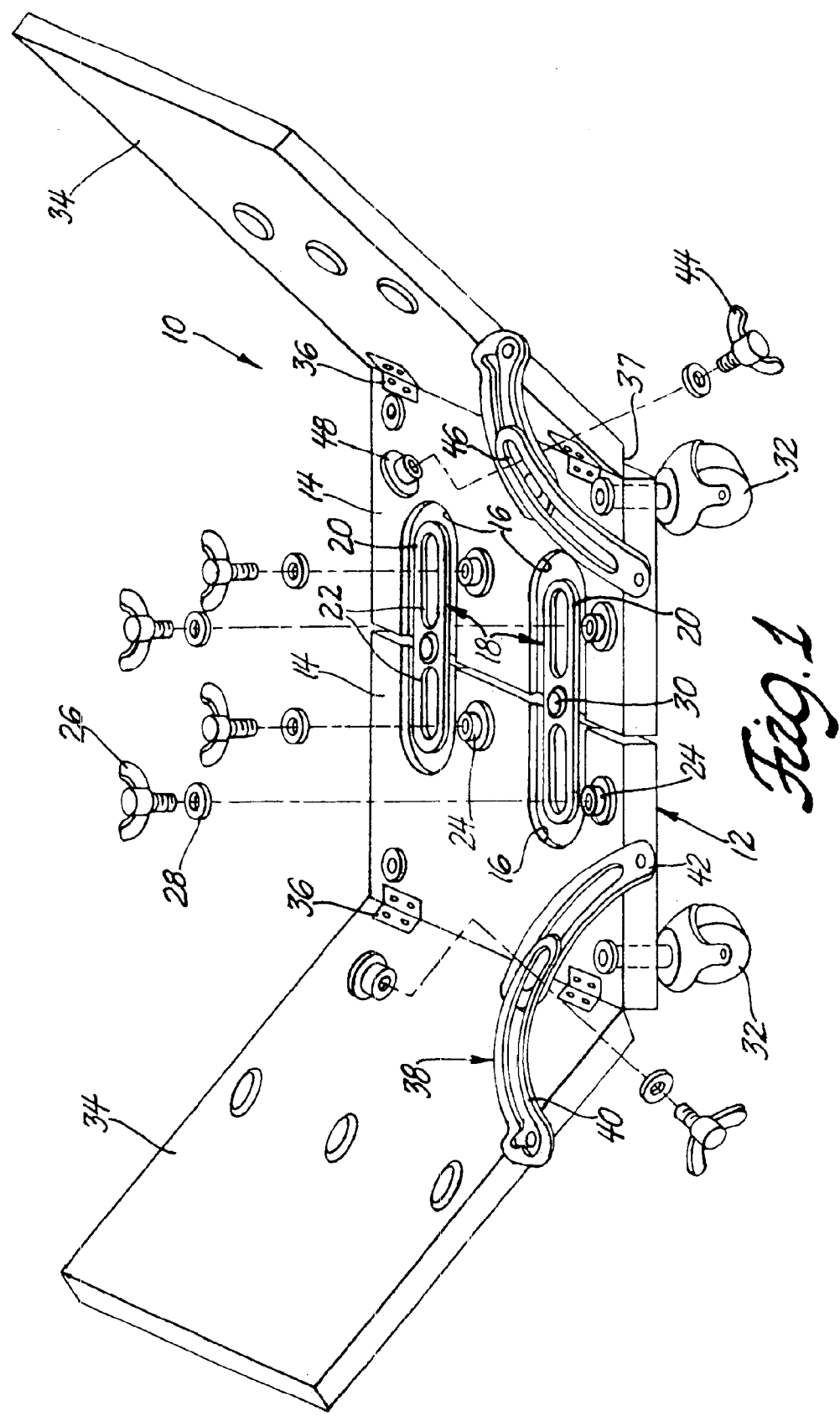
FIG. 1 is a perspective view of one embodiment of this invention.

Referring to the accompanying drawing in which like numerals refer to like parts and initially to FIG. 1, a foldable tire dolly according to this invention is designated generally 10. The dolly has a rectangular base 12 composed or formed of two separate pieces 14 which abut each other near the centerline of the rectangular base 12. The two separate pieces 14 have two semi oval slots 16 incised into their upper surfaces so that when the pieces of the base member are brought into abutment there is an oval depression 18 formed in the upper surface of the rectangular base member 12. A complimentary oval shaped adjustable brace 20, sized slightly smaller than the oval depression 18, is nested in each of the oval depressions. Each of the oval braces 20 has two longitudinal oval apertures 22, one oval aperture being formed on each end of the individual oval brace. The longitudinal oval apertures 22 engage complementary internally threaded studs 24 located in and extending upward from the bottom surface of the oval depressions 18. The oval adjustable braces 20 can be secured in position by means of complementary threaded fasteners 26 and associated washers 28, by inserting the fasteners into the internally threaded studs 24 and tightening. As shown, the threaded fasteners 26 can be of a design to be tightened by hand obviating the need for special tools. When the threaded fasteners 26 are loosened, the two base pieces 14 can be moved closer together or further apart in order to adjust the rectangular platform 12 to the desired length. In this embodiment, each of the adjustable oval braces 20 has a bearing member 30 located near its center. The bearing member 30 shown is a sphere mounted in a complimentary housing located in the adjustable brace 20.

The rectangular base 12 is mounted on a plurality of casters 32, which allow the tire dolly 10 to be moved over the ground while carrying the tie assembly. The type of caster or wheel chosen can be determined by the ground over which the dolly is to be moved, softer soils generally requiring a wider caster to allow movement.

The rectangular base 12 has two wings 34 attached to the rectangular base member 12 one wing being attached to each end of the rectangular base. The wings 34 are fastened to the rectangular bade 12 by means of hinges 36, which allows the wings to rotate inward towards the rectangular base 12 to a point where the wing is in contact with the tire assembly loaded on the dolly 10. The wings 34 also have the edge hinged to the base undercut 37 so that the wing can rotate outward past horizontal to a position where the end of the wing opposite the hinge touches the ground this forms a ramp allowing a tire assembly to be rolled up the ramp on to the base member 12. This will eliminate lifting of heavy tire assemblies and thereby improves safety and lessens the chance of injury. Each of the wings 34 has at least one bearing member 30 on its surface to allow a tire assembly on the dolly 10 to be rotated on the dolly; this allows the wheel rim to be rotated so the holes in the rim align with the threaded studs on the axle.

A pair of adjustable arcuate braces 38 are formed of curved arms 40, 42. Arm 40 has one end firmly attached to its associated wing 34, and arm 42 has one end attached to its associated base member 14. Once the rectangular base 12 has been adjusted for width and the wings 34 are positioned so they are juxtaposed the tire, threaded fasteners 44 can be placed in a slot 46 in the arms 40, 42 and secured with a complimentary nut 48. The resulting arcuate braces 38 not only position the wings 34 but provide a side support for the tire assembly to help keep the tire assembly on the dolly 10 as it is moved.

Figure 2:
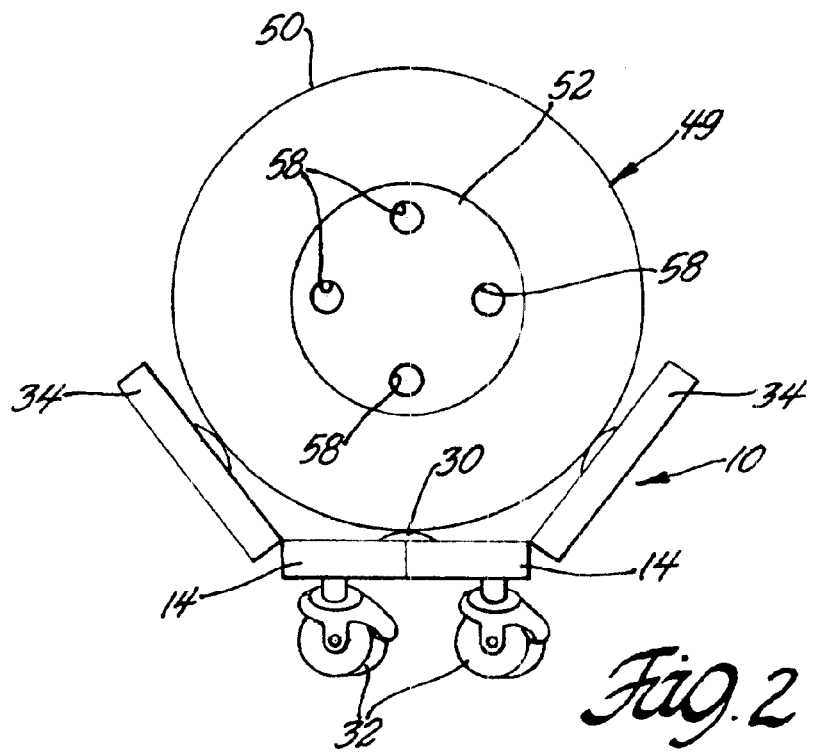
FIG. 2 is a side view of one embodiment of this invention with a vehicle tire assembly thereon.
Figure 3:
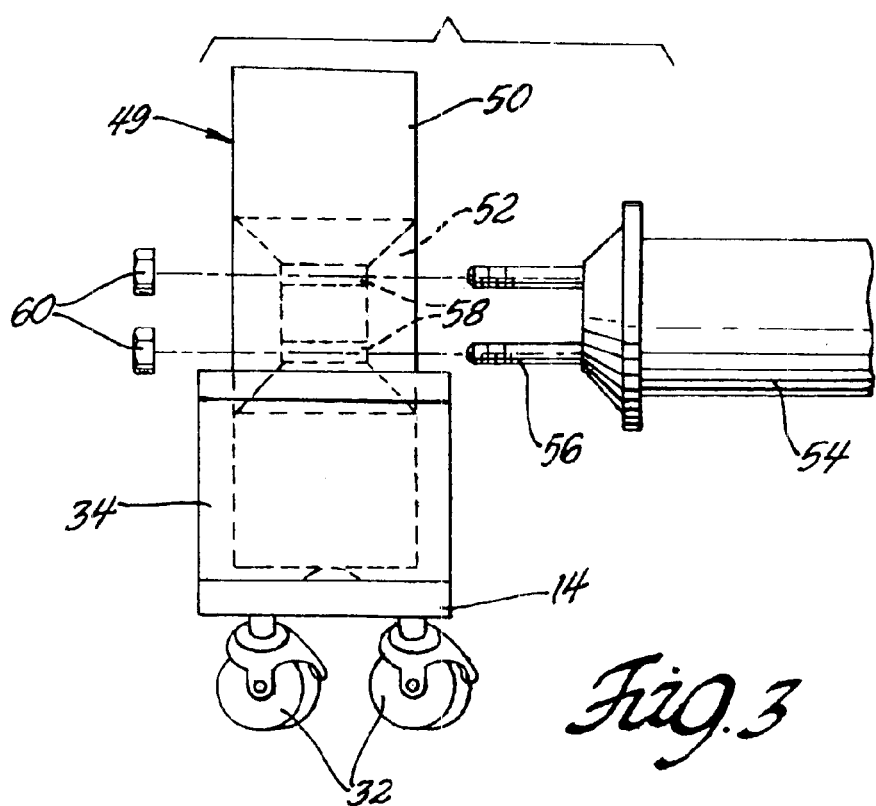
FIG. 3 is side view of FIG. 2 showing the vehicle tire assembly aligned with the threaded axle studs.

In FIG. 2, the dolly 10 of FIG. 1 is shown with a tire assembly 49 held in position with a tire 50 mounted on a wheel rim 52 ready for installation. The dolly 10 is then moved next to an axle 54, shown in FIG. 3, the axle having a plurality of threaded studs 56 to be used in mounting the wheel rim 52 on the axle. If the apertures 58 in the wheel rim 52 do not align with the threaded studs 56 the tire assembly 49 can be rotated to align the studs and the dolly 10 moved towards the axle 54 until the threaded studs extend through the wheel rim. Complimentary threaded nuts 60 are then tightened on the threaded studs 56 to hold the tire assembly in position. The dolly 10 can then be withdrawn as the bearing members 30 allow easy withdrawal.

Various alterations and modifications will become apparent to those skilled in the art without departing from the scope and spirit of this invention and it is understood this invention is limited only by the following claims.

What is claimed is:

1. A foldable dolly for moving and positioning a vehicle tire assembly having a tire mounted on a rim to be attached to a vehicle comprising:

a rectangular base member, formed of two separate base pieces with two adjustable slides mounted longitudinally on the base with one end of the slide firmly attached to each of the base pieces, the base member being mounted on a plurality of casters;

a pair of wings hinged to opposite ends of the rectangular member;

adjustable positioning members having one end attached to the base member and the other end attached to one of the wings; and a plurality of bearings at least one bearing being mounted on each wing and at least one bearing on the rectangular base member.

2. The foldable dolly of claim 1 where at least one wing is hinged to the rectangular base so it can be rotated to a position to form a ramp allowing the tire assembly to be rolled onto the rectangular base member.

* * * * *